(12) United States Patent
Taku et al.

(10) Patent No.: US 10,272,373 B2
(45) Date of Patent: Apr. 30, 2019

(54) RETURN FILTER

(71) Applicant: YAMASHIN-FILTER CORP., Kanagawa (JP)

(72) Inventors: Meiho Taku, Kanagawa (JP); Makoto Ishizuka, Kanagawa (JP); Tatsuhiro Oshita, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 15/843,072

(22) Filed: Dec. 15, 2017

(65) Prior Publication Data
US 2018/0104629 A1 Apr. 19, 2018

Related U.S. Application Data

(63) Continuation of application No. PCT/JP2016/067546, filed on Jun. 13, 2016.

(30) Foreign Application Priority Data

Jun. 18, 2015 (JP) ................................. 2015-123227

(51) Int. Cl.
*B01D 36/00* (2006.01)
*B01D 29/33* (2006.01)
(Continued)

(52) U.S. Cl.
CPC ....... *B01D 36/001* (2013.01); *B01D 19/0057* (2013.01); *B01D 29/21* (2013.01);
(Continued)

(58) Field of Classification Search
CPC .. B01D 36/001; B01D 29/925; B01D 35/147; B01D 35/027; B01D 29/21; B01D 29/33;
(Continued)

(56) References Cited

U.S. PATENT DOCUMENTS

| | | |
|---|---|---|
| 3,161,490 A | 12/1964 | Dudek |
| 4,997,556 A | 3/1991 | Yano et al. |

(Continued)

FOREIGN PATENT DOCUMENTS

| | | |
|---|---|---|
| JP | H02-131012 U | 10/1990 |
| JP | 2004-11873 A | 1/2004 |
| JP | 2004-84923 A | 3/2004 |

OTHER PUBLICATIONS

Extended European Search Report issued in European Patent Application No. 16811592.1 dated Jun. 4, 2018 (8 pages).

(Continued)

*Primary Examiner* — Madeline Gonzalez
(74) *Attorney, Agent, or Firm* — Nakanishi IP Associates, LLC

(57) ABSTRACT

A return filter is provided in a tank, for removing bubbles from hydraulic oil before returning the hydraulic oil to the tank. A vortex forming portion that includes a spiral-shaped blade member is provided in an outflow portion that has a substantially cylindrical shape and communicates with a hollow portion of a filter element. Thus, a vortex forms in the hydraulic oil flowing through the outflow portion and bubbles contained in the hydraulic oil are collected.

7 Claims, 8 Drawing Sheets

(51) Int. Cl.
  *B01D 35/00* (2006.01)
  *F15B 1/26* (2006.01)
  *F15B 21/04* (2019.01)
  *B01D 19/00* (2006.01)
  *F01M 1/10* (2006.01)
  *F16N 39/00* (2006.01)
  *F15B 21/044* (2019.01)
  *B01D 35/027* (2006.01)
  *B01D 35/147* (2006.01)
  *B01D 29/21* (2006.01)
  *B01D 29/92* (2006.01)
  *B04C 3/06* (2006.01)
  *F16N 29/00* (2006.01)
  *B04C 3/00* (2006.01)
  *B04C 9/00* (2006.01)

(52) U.S. Cl.
  CPC ........... *B01D 29/33* (2013.01); *B01D 29/925* (2013.01); *B01D 35/005* (2013.01); *B01D 35/027* (2013.01); *B01D 35/147* (2013.01); *F01M 1/10* (2013.01); *F15B 1/26* (2013.01); *F15B 21/04* (2013.01); *F15B 21/044* (2013.01); *F16N 39/002* (2013.01); *B04C 3/06* (2013.01); *B04C 2003/006* (2013.01); *B04C 2009/002* (2013.01); *F01M 2001/1035* (2013.01); *F16N 29/00* (2013.01)

(58) Field of Classification Search
  CPC . B01D 19/0057; B01D 35/005; F15B 21/044; F15B 21/04; F15B 1/26; F01M 1/10; F01M 2001/1035; B04C 3/06; B04C 2003/006; B04C 2009/002; F16N 29/00; F16N 39/002
  USPC ......... 210/434, 97, 111, 130, 132, 133, 787, 210/213, 219
  See application file for complete search history.

(56) References Cited

U.S. PATENT DOCUMENTS

| | | |
|---|---|---|
| 5,431,228 A | 7/1995 | Weingarten et al. |
| 2003/0233942 A1* | 12/2003 | Konishi ............... F15B 1/26 96/208 |
| 2012/0091047 A1 | 4/2012 | Renner et al. |

OTHER PUBLICATIONS

Written Opinion of International Searching Authority issued in PCT/JP2016/067546 dated Sep. 6, 2016, with English Translation (7 pages).

International Search Report issued in International Application No. PCT/JP2016/067546 dated Sep. 6, 2016 and English translation (4 pages).

Written Opinion of International Searching Authority issued in PCT/JP2016/067546 dated Sep. 6, 2016 (3 pages).

\* cited by examiner

RETURN FILTER

CROSS-REFERENCE TO RELATED APPLICATIONS

The present application is a continuation application of International Patent Application No. PCT/JP2016/067546 filed on Jun. 13, 2016, which claims priority to Japanese Patent Application No. 2015-123227 filed on Jun. 18, 2015, the entire contents of which are incorporated by reference.

TECHNICAL FIELD

The present invention relates to a return filter.

BACKGROUND ART

Patent Document 1 discloses a hydraulic oil tank that includes a return port provided in an upper portion of the hydraulic oil tank. This return port is configured to return hydraulic oil from a cylinder side via a bubble removing device provided outside the hydraulic oil tank. The hydraulic oil returned from this return port is passed through a filter and housed in the hydraulic oil tank.

CITATION LIST

Patent Document

Patent Document 1: JP 2004-11873 A

Nevertheless, in the invention described in Patent Document 1, the problem arises that the bubble removing device needs to be separately provided outside the liquid tank. Further, when the hydraulic oil passes through the filter (hereinafter, referred to as a "return filter") provided in the tank, bubbles may be produced in the hydraulic oil.

In light of the above, an object of the present invention is to provide a return filter capable of removing bubbles contained in hydraulic oil.

SUMMARY OF INVENTION

A return filter according to one or more embodiments of the present invention serves as, for example, a return filter provided in a tank. Such a return filter includes a filter element including a filtration member having a substantially cylindrical shape, a filter case having a bottomed substantially cylindrical shape and provided with the filtration member therein, an inflow portion configured to allow an inflow of oil and to communicate with a space between the filter case and the filter element, an outflow portion having a substantially cylindrical shape and provided to a bottom surface of the filter case, the outflow portion being configured to communicate with a hollow portion of the filter element, and a vortex forming portion including a blade member having a spiral shape and provided in the outflow portion.

According to one or more embodiments of the present invention, in the returning filter, the vortex forming portion that includes a blade member having a spiral shape is provided in the outflow portion that has a substantially cylindrical shape and communicates with the hollow portion of the filter element. This configuration allows the hydraulic oil flowing through the outflow portion to produce a vortex. As a result, the bubbles contained in the hydraulic oil are collected along an axis of the vortex, making it possible to remove the bubbles contained in the hydraulic oil when the hydraulic oil passes through the filtration member and the like in the return filter.

Here, the vortex forming portion may include a tubular portion having a substantially cylindrical shape with a covered upper end, the tubular portion being formed extending along an axis of the blade member at a substantial center of the vortex forming portion. The blade member may include, on a lower side thereof, a passage that crosses the blade member in a radial direction. The tubular portion and the outflow portion may each include a hole that communicates with the passage. This configuration allows the bubbles collected along the axis of the vortex to be released outside the return filter.

Here, the return filter may further include an outflow pipe that protrudes downward from a bottom surface of the filter case and is configured to communicate with the outflow portion. A lower end of the outflow pipe may be covered by a lower end surface having a substantially truncated cone shape that increases in height and decreases in width toward a center, and a side surface of the outflow pipe in a vicinity of the lower end surface may include a plurality of holes. This configuration causes a flow of the hydraulic oil to change to a direction substantially orthogonal to the axis, allowing the hydraulic oil to flow out horizontally.

Here, the return filter may further include a lid configured to cover an upper end of the filter case, a valve provided to the lid and configured to open and close depending on a difference in a pressure on an outer side of the filtration member and a pressure on an inner side of the filtration member, and a bypass strainer configured to allow passage of the oil after passing through the valve and including a frame having an inner peripheral surface to which the valve is fitted. In such a return filter, the filter element further includes an upper plate that covers an upper end of the filtration member, and the upper plate and the frame are integrated with each other. This configuration causes the upper plate and the bypass strainer to be integrated with each other, making it possible to reduce the size of the filter element.

According to one or more embodiments of the present invention, bubbles can be removed.

DESCRIPTION OF EMBODIMENTS

Below, detailed description of embodiments of the present invention will be given with reference to the drawings.

Figure 1:
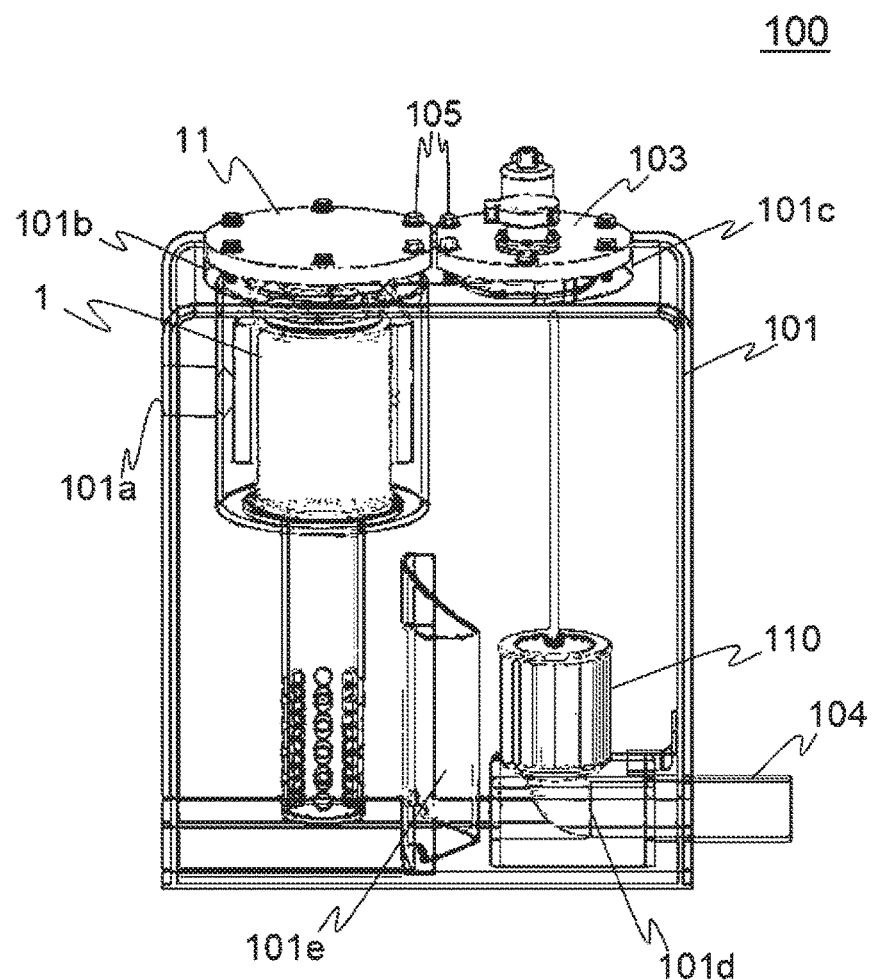
FIG. 1 is a diagram illustrating an overview of a hydraulic oil tank 100 provided, therein, with a return filter 1 according to an embodiment of the present invention.

FIG. 1 is a diagram illustrating an overview of a hydraulic oil tank 100 provided, therein, with a return filter 1 according to an embodiment of the present invention. In FIG. 1, main parts of the hydraulic oil tank 100 are illustrated from a perspective view.

The hydraulic oil tank 100 is installed in a work machine (a hydraulic apparatus, for example, not illustrated), and is disposed inside a hydraulic circuit of hydraulic oil supplied to the hydraulic apparatus and is configured to store the hydraulic oil. The hydraulic oil tank 100 includes a tank main body 101 having a box shape, for example, and this tank main body 101 has a hollow interior. The tank main body 101 primarily includes the return filter 1 and a suction strainer 110.

In the hydraulic circuit, the hydraulic oil passes through the hydraulic apparatus and is introduced into the hydraulic oil tank 100.

An inflow port 101a configured to allow the hydraulic oil to flow into the tank main body 101 is formed on a side surface of the tank main body 101. The hydraulic oil that has entered through the inflow port 101a is introduced into the return filter 1. The hydraulic oil is filtered by the return filter 1 and is stored in the hydraulic oil tank 100.

Openings 101b, 101c used for maintenance of the return filter 1, the suction strainer 110, and the like are formed at an upper end portion of the tank main body 101. The return filter 1 is attached to the opening 101b. Further, a lid 103 is attached to the opening 101c.

Bolt insertion holes are formed in peripheral edge portions of lids 11, 103. Bolts 105 inserted through the bolt insertion holes are screwed into bolt holes (not illustrated) of the tank main body 101, thereby tightening the lids 11, 103 to the tank main body 101.

An outflow port 101d that allows the hydraulic oil inside the tank main body 101 to flow out to a hydraulic pump (not illustrated) is formed in a vicinity of a lower end portion of the tank main body 101 (on a side surface of the tank main body 101 near a bottom surface in the present embodiment). A suction pipe 104 that leads to a suction port of the hydraulic pump (not illustrated) is fitted into the outflow port 101d from an outer side of the tank main body 101.

To prevent foreign matter from entering the suction pipe 104, the suction strainer 110 is provided on an upper side of the outflow port 101d (inner side of the tank main body 101). The hydraulic oil stored in the hydraulic oil tank 100 is suctioned into the hydraulic pump (not illustrated), flows out to the suction pipe 104 via the suction strainer 110, and is supplied once again to the hydraulic apparatus.

A partition plate 101e that defines a space where the suction strainer 110 is provided and a space where the return filter 1 is provided is provided to the bottom surface of the tank main body 101. Note that the partition plate 101e is not necessarily required.

Figure 2:
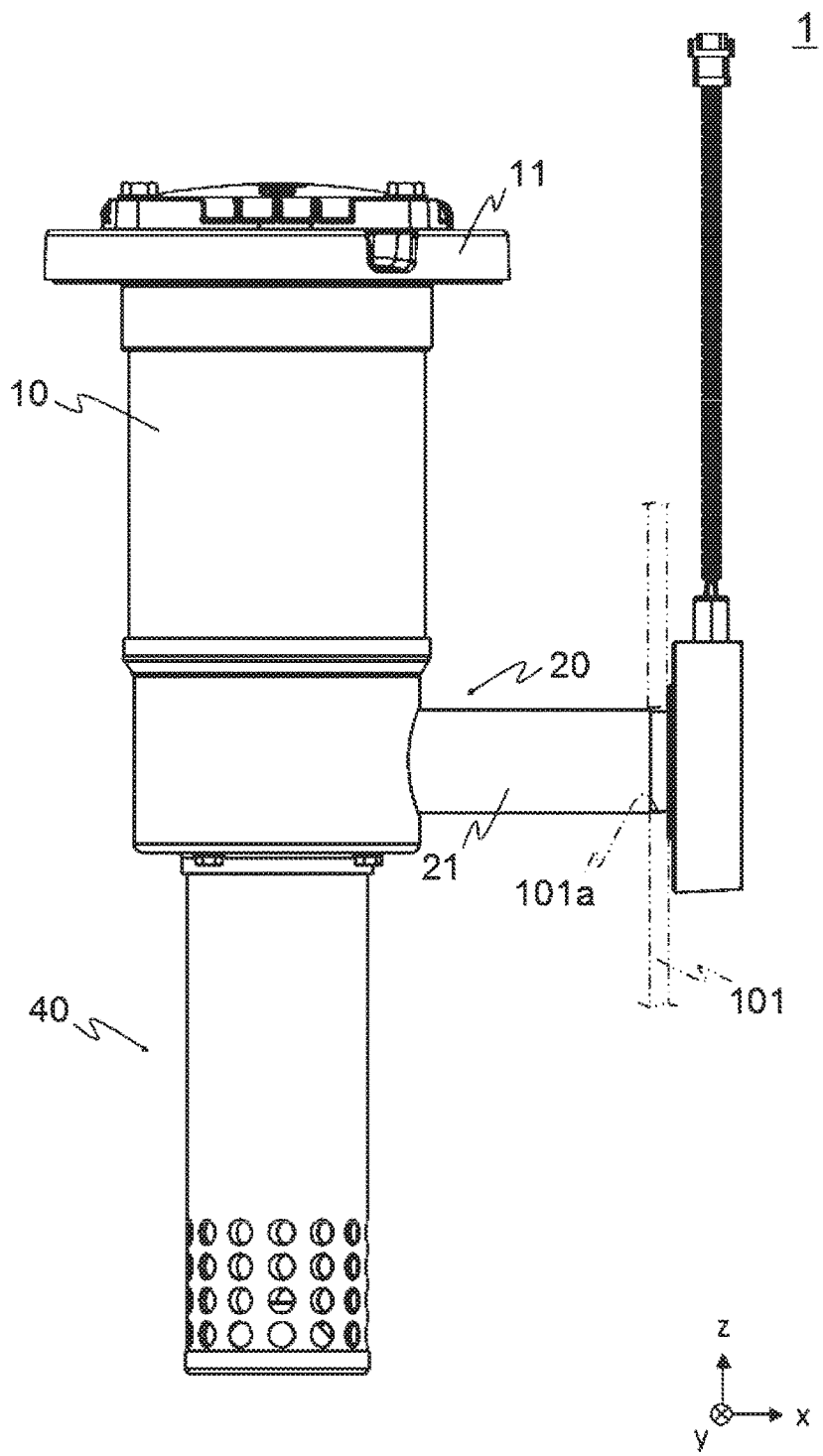
FIG. 2 is a side view illustrating an overview of the return filter 1.
Figure 3:
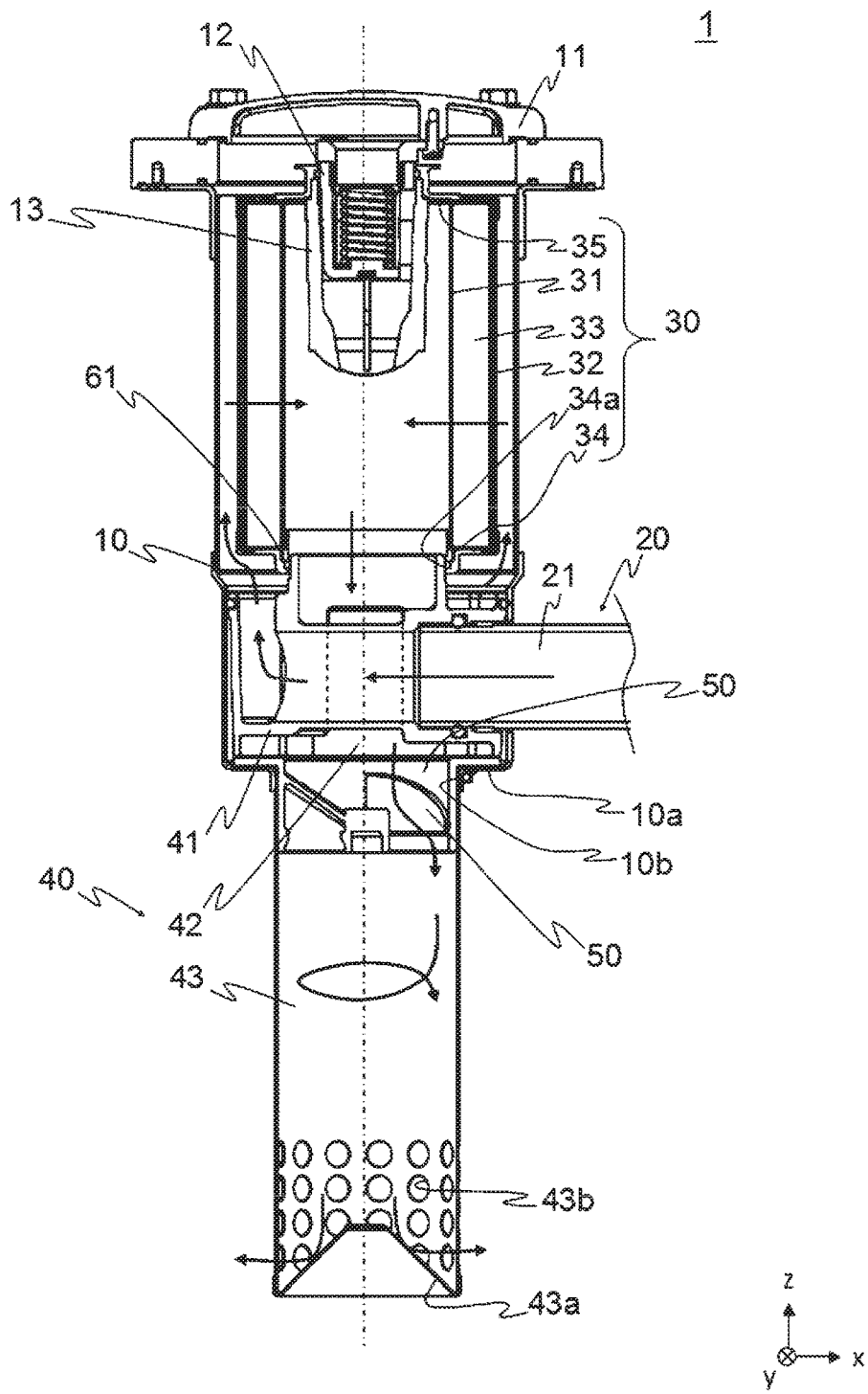
FIG. 3 is a cross-sectional view illustrating an overview of the return filter 1.

FIG. 2 is a side view illustrating an overview of the return filter 1. Further, FIG. 3 is a cross-sectional view illustrating an overview of the return filter 1 (note that hatching indicating a cross section is omitted).

The return filter 1 mainly includes a filter case 10, an inflow portion 20, a filter element 30, an outflow portion 40, and a vortex producing portion 50.

The filter case 10 is a member having a bottomed substantially cylindrical shape, and is formed from a metal. The lid 11 is provided to the filter case 10 so as to cover an upper end of the filter case 10.

A valve 12 is provided to the lid 11. The valve 12 is configured to open and close depending on a difference between a pressure between the filter case 10 and the filter element 30 (on an outer side of the filter element 30), and a pressure on the inner side of the filter element 30. An outer peripheral surface of the valve 12 is fitted to an inner peripheral surface of a bypass strainer 13 through which the hydraulic oil passes after passing through the valve 12.

The inflow portion 20 includes an inflow pipe 21 inserted into the inflow port 101a. The hydraulic oil flows into the inflow pipe 21. The hydraulic oil that has flowed from the inflow pipe 21 is introduced into a space between the filter case 10 and the filter element 30.

The filter element 30 is a member having a substantially cylindrical shape provided in the filter case 10. An upper end of the filter element 30 is formed by the lid 11 and a lower end is formed by the outflow portion 40, which causes the filter element 30 to be held in the filter case 10.

The filter element 30 mainly includes an inner tube 31, an outer tube 32, a filtration member 33, and plates 34, 35.

The inner tube 31 and the outer tube 32 are members that have substantially hollow cylindrical shapes and include openings at both ends. The inner tube 31 and the outer tube 32 are formed from a material (stainless steel, for example) having high corrosion resistance. Holes through which the hydraulic oil passes are formed substantially in an entire region of the inner tube 31 and the outer tube 32. Note that the inner tube 31 and the outer tube 32 may be formed from a resin. Further, the outer tube 32 is not necessarily required.

The filtration member 33 is provided between the inner tube 31 and the outer tube 32. The filtration member 33 has a substantially cylindrical shape and a thickness in a radial direction. A height of the filtration member 33 is substantially the same as a height of the inner tube 31 and the outer tube 32.

The filtration member 32 is formed by pleating a filter paper formed of a synthetic resin, paper, or the like, and connecting both ends of the pleated filter paper to form a cylindrical shape. As a result, the filtration member 33 is formed into a substantially cylindrical pleated shape. The filtration member 33 is configured to filter the hydraulic oil.

A plate 34 is provided to respective first ends of the outer tube 32 and the inner tube 31 and a plate 35 is provided to respective second ends. The plate 34 and the plate 35 are members having a substantially circular plate shape or a bottomed substantially cylindrical shape, and are formed from a resin or a metal.

The plate 34 and the plate 35 are provided so as to cover the ends (openings) of the inner tube 31, the outer tube 32, and the filtration member 33. In other words, the plate 34 and the plate 35 sandwich the inner tube 31, the outer tube 32, and the filtration member 33.

The plate 34 covers lower ends of the inner tube 31, the outer tube 32, and the filtration member 33. An inner peripheral surface 34a of the plate 34 is fitted to a fitting pipe 41 (described below) of the outflow portion 40.

A sealing member 61 is provided to an inner peripheral surface of the plate 34. The sealing member 61 is configured so that the hydraulic oil does not enter the fitting pipe 41 from between the plate 34 and the fitting pipe 41.

Figure 4:
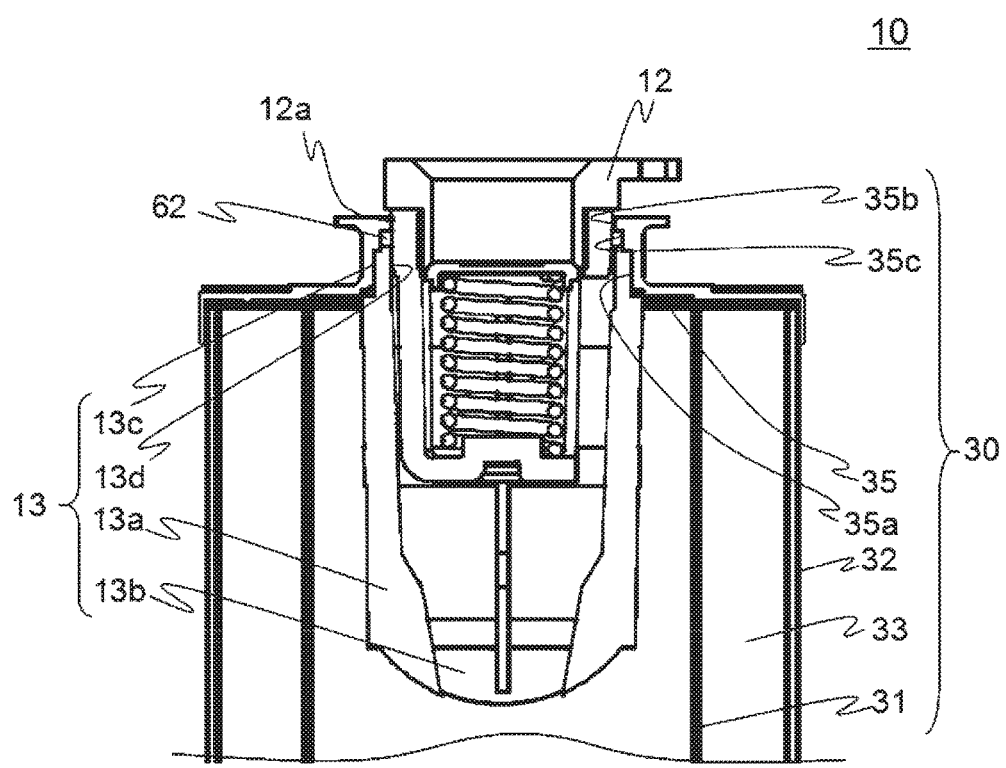
FIG. 4 is an enlarged partial view of FIG. 3.

The plate 35 covers the upper ends of the inner tube 31, the outer tube 32, and the filtration member 33. FIG. 4 is an enlarged partial view of FIG. 3.

The bypass strainer 13 mainly includes a frame 13a having a substantially cylindrical shape as a whole, and a filtration portion 13b having a mesh shape stretched in a space of the frame 13a.

The inner peripheral surface 35a of the plate 35 is fitted to the outer peripheral surface 13c of the bypass strainer 13.

Thus, the plate 35 and the bypass strainer 13 are integrated. As a result, the size of the return filter 1 can be reduced.

The plate 35 and the inner peripheral surface 35b are fitted to an outer peripheral surface 12a of the valve 12. As a result, the filter element 30 and the bypass strainer 13 are attached to the valve 12. Note that the outer peripheral surface 12a of the valve 12 is fitted to an inner peripheral surface 13d of the bypass strainer 13.

A sealing member 62 is provided to a groove 35c formed in an inner peripheral surface of the plate 35. Thus, in a case that the inner peripheral surface 35b is fitted to the outer peripheral surface 12a, the hydraulic oil does not enter the bypass strainer 13 from the area between the valve 12 and the plate 35.

The description will now return to FIG. 3. The outflow portion 40 has a substantially cylindrical shape as a whole, and mainly includes a fitting pipe 41, an inner side pipe 42, and an outflow pipe 43.

The fitting pipe 41 is a member having a substantially cylindrical shape, and is provided in the filter case 10. The inner peripheral surface 34a of the plate 34 is fitted to an outer peripheral surface of the fitting pipe 41. Thus, a hollow portion of the filter element 30 (a hollow portion of the inner tube 31) and a hollow portion of the fitting pipe 41 are in communication.

The inner side pipe 42 is a member having a substantially cylindrical shape, and is provided in the filter case 10. Further, the inner side pipe 42 is provided to the hollow portion of the fitting pipe 41. Thus, the hydraulic oil after filtration that has entered the fitting pipe 41 flows out to the inner side pipe 42.

The outflow pipe 43 is provided to a lower end of the inner side pipe 42 via the filter case 10. The outflow pipe 43 is a member having a substantially cylindrical shape, and is provided protruding downward from the bottom surface 10a (surface on the −z side) of the filter case 10. The outflow pipe 43 communicates with the inner side pipe 42 via the opening 10b.

Note that while the inner side pipe 42 is provided above the bottom surface of the filter case 10 and the outflow pipe 43 is provide below the bottom surface of the filter case 10 in the present embodiment, a configuration in which the outflow portion 40 is provided to the bottom surface of the filter case 10 is not limited to this embodiment. The outflow portion 40 need only to be provided to the bottom surface of the filter case 10 with an upper end in communication with the inner peripheral portion of the filter element 30 and a lower end surface protruding into the tank main body 101.

A lower end of an outflow pipe 43 is covered by a lower end surface 43a having a substantially truncated cone shape that increases in height and decreases in width toward the center. A plurality of holes 43b are formed in a side surface of the outflow pipe, in a vicinity of the lower end surface 43a. As a result, the hydraulic oil that has flowed downward (in the −z direction) through the outflow pipe 43 comes into contact with the lower end surface 43a, thereby changing the flow to a direction substantially orthogonal to the z direction and causing the hydraulic oil to flow out from the holes 43b and into the tank main body 101.

Figure 5:
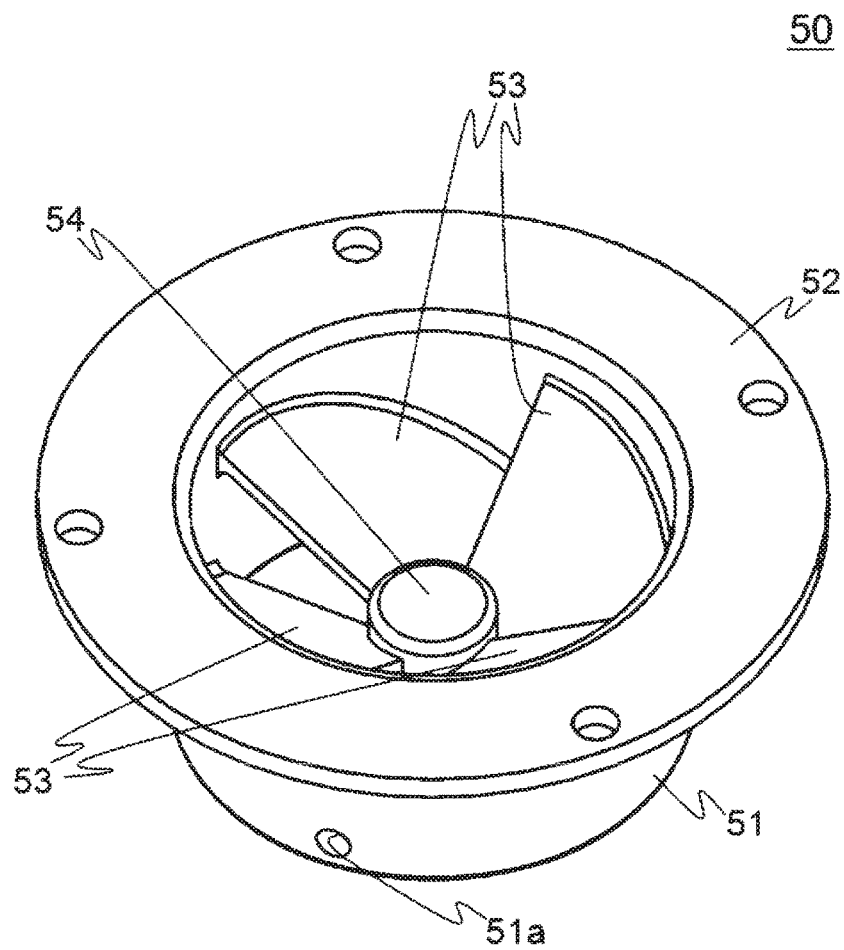
FIG. 5 is a perspective view illustrating details of a vortex producing portion 50.
Figure 6:
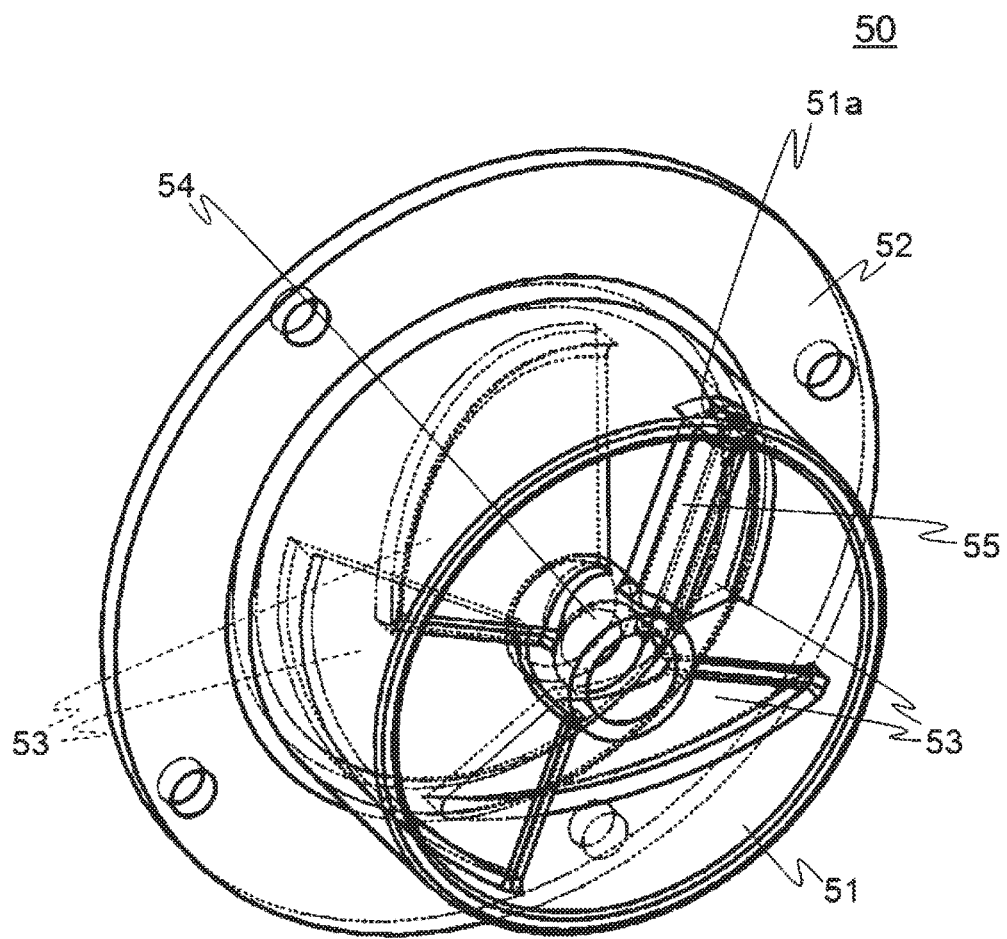
FIG. 6 is a perspective view illustrating details of the vortex producing portion 50.
Figure 7:
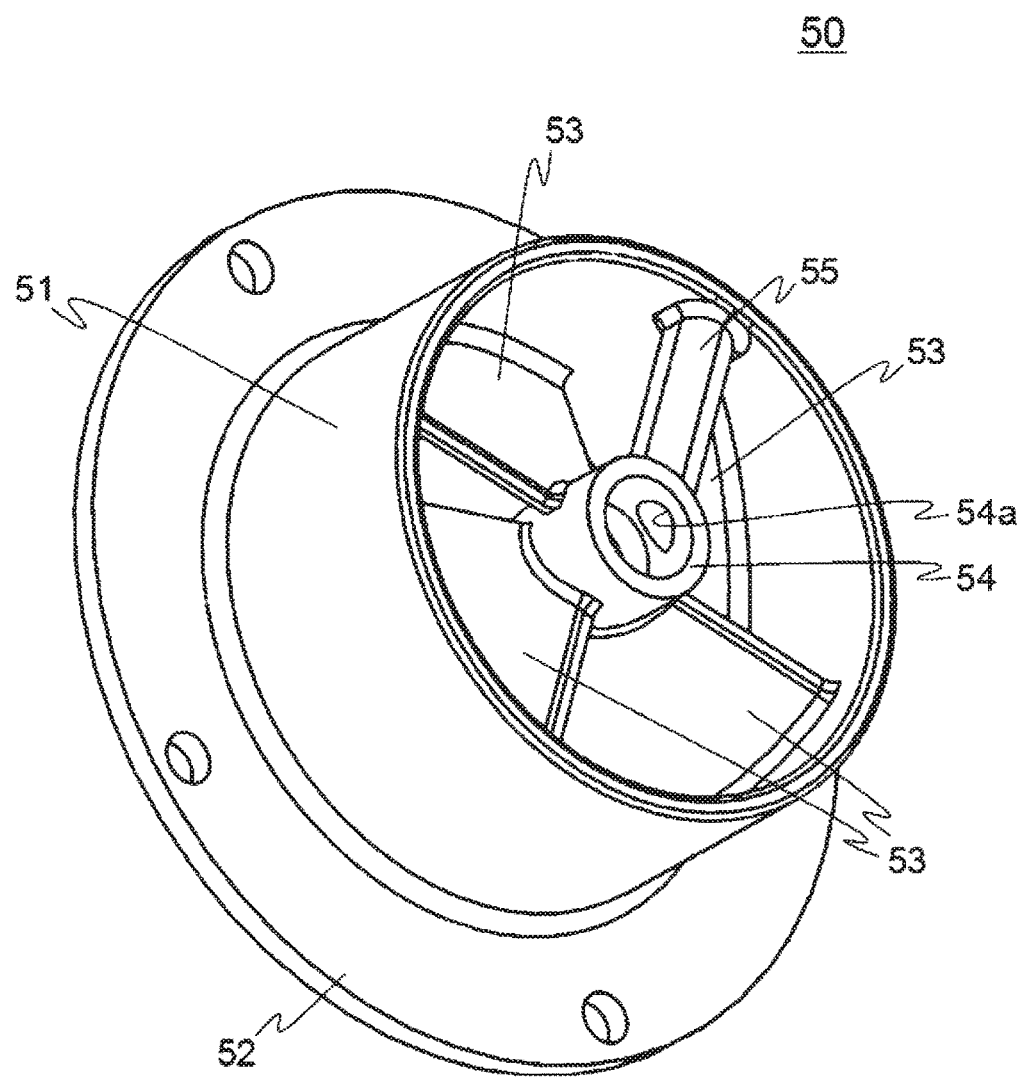
FIG. 7 is a perspective view illustrating details of the vortex producing portion 50.

Further, the vortex producing portion 50 is provided to a hollow portion of the outflow pipe 43. FIGS. 5 to 7 are perspective views illustrating details of the vortex producing portion 50. Note that FIG. 6 is a perspective view of a portion that is not visible.

The vortex producing portion 50 mainly includes a main body portion 51, a flange portion 52, a blade member 53, a tubular portion 54, and an air flow path 55.

The main body portion 51 is a member having a substantially cylindrical shape, and is inserted into the outflow pipe 43. The flange portion 52 for attaching the vortex producing portion 50 to the outflow pipe 43 and the filter case 10 is integrally formed with an upper end of the main body portion 51.

As illustrated in FIG. 3, in a case that the flange portion 52 is provided on an inner side of the bottom surface 10a of the filter case 10 so that the main body portion 51 protrudes downward, the main body portion 51 is inserted into the opening 10b formed in the bottom surface 10a. Further, the main body portion 51 inserted into the opening 10b is also inserted into the outflow pipe 43 that communicates with the opening 10b.

The description will now return to FIGS. 5 to 7. The blade members 53 having a spiral shape are formed on an inner peripheral surface of the main body portion 51. Each of the blade members 53 is a member that produces a vortex in the hydraulic oil that flows into the outflow pipe 43. The blade members 53, having a spiral shape, allow the hydraulic oil that flows into the outflow pipe 43 to flow downward (in the −z direction) while swirling and forming a vortex, as indicated by the arrows in FIG. 3.

While four blade members 53 are provided in a circumferential direction in the present embodiment, the number of blade members 53 is not limited to four. For example, in a case that the blade members 53 having a fan shape in a planar view are used, the number of blade members 53 needs only to be two or greater. Further, the shape of the blade members 53 is not limited to the fan shape. For example, the blade member may be a single blade having a spiral shape continuously extending for 360 degrees or greater.

The tubular portion 54 is provided along an axis of the blade member 53. The tubular portion 54 has a substantially cylindrical shape with an upper end thereof covered, and includes a space where the bubbles contained in the hydraulic oil accumulate (details described below).

The air flow path 55 that crosses in the radial direction is formed in the blade member 53, on a surface on a lower side (−z side). While the air flow path 55 is a tubular member in the present embodiment, the shape of the air flow path 55 is not limited thereto. For example, a groove between two ribs formed on a back surface of the blade member 53 may serve as the air flow path. Further, the position and number of the air flow paths 55 are also not limited to such a configuration. For example, the air flow path 55 may be formed on each of the blade members 53, or a plurality of the air flow paths 55 may be formed on one blade member 53.

A hole 51a that communicates with the air flow path 55 is formed in the main body portion 51 (refer to FIGS. 5 and 6). A hole (not illustrated) that communicates with the hole 51a is formed in the outflow pipe 43.

A hole 54a that communicates with the air flow path 55 is formed in the tubular portion 54 (refer to FIG. 7). As a result, the air accumulated in the tubular portion 54 passes through the air flow path 55, the hole 51a, and the hole (not illustrated) formed in the outflow pipe 43, and is released into the tank main body 101.

Note that while the vortex producing portion 50 is provided in the outflow pipe 43 in the present embodiment, the vortex producing portion 50 need only to be provided to the outflow portion 40, and thus may be provided to the fitting pipe 41 or the inner side pipe 42. Further, while the outflow portion 40 and the vortex producing portion 50 are separately provided in the present embodiment, the vortex producing portion 50 may be formed in the outflow portion 40. In a case that the vortex producing portion 50 is formed in the outflow portion 40, at least the blade member 53, the tubular portion 54, and the air flow path 55 need to be formed.

Next, the functionality of the return filter 1 thus configured will be described. The arrows in FIG. 3 indicate the flow of the hydraulic oil in the return filter 1.

The hydraulic oil that has flowed into the inflow portion 20 is introduced into the space between the filter case 10 and the filter element 30. The hydraulic oil flows from the outer side to the inner side of the filter element 30, and the filtered hydraulic oil flows out to the inner side of the inner tube 31.

The filtered hydraulic oil flows downward from the inner side of the inner tube 31 and through the inner sides of the fitting pipe 41 and the inner side pipe 42, and is introduced into the vortex producing portion 50.

The hydraulic oil introduced into the vortex producing portion 50 collides with the blade members 53, changing the direction of flow. The blade members 53, having a spiral shape, produce a spiral-shaped vortex in the hydraulic oil that has collided with the blade members 53.

In a case that the hydraulic oil flows downward (in the −z direction) while swirling and forming a spiral-shaped vortex, the bubbles contained in the hydraulic oil are collected along the axis of the vortex (that is, the axis of the blade members 53) by centrifugal force. In the vicinity of the axis of the vortex, the flow rate is near zero, and thus the bubbles collected along the axis collide with each other to increase in size. The bubbles that have grown to a certain size or larger move upward (in the +z direction) and accumulate in a space in a vicinity of an upper end of the tubular portion 54.

The bubbles accumulated in the vicinity of the upper end of the tubular portion 54 flow through the hole 54a and out to the air flow path 55. The bubbles that have flowed out to the air flow path 55 flow through the hole 51a and the like, and are released to the outside of the return filter 1.

As a result, the hydraulic oil that has flowed downward while swirling and forming a vortex comes into contact with the lower end surface 43a, thereby changing the flow to a direction substantially orthogonal to the z direction and causing the hydraulic oil to flow through the holes 43b and into the tank main body 101. As a result, the hydraulic oil that has flowed through the outflow pipe 43 cannot vigorously collide with the bottom surface of the tank main body 101.

According to the present embodiment, the bubbles contained in the hydraulic oil can be removed by the return filter 1. This makes it possible to prevent defects that occur as a result of air being suctioned into the pump. The bubbles may also be prevented from bursting inside the hydraulic circuit or the like, which causes the temperature and the pressure of the hydraulic oil to temporarily increase to a significant degree and, as a result, the occurrence of part damage and the like.

Note that while bubbles are collected and removed by producing a vortex in the hydraulic oil by the vortex producing portion 50 in the present embodiment, the method of collecting the bubbles is not limited thereto. For example, the bubbles may be removed by filling the outflow pipe 43 with steel wool or the like.

Steel wool is obtained by processing an iron (stainless steel, for example) into fine, long fibers, and this steel wool can be bundled to form various shapes. The member formed by bundling the steel wool has a plurality of spaces formed in a surface and interior thereof. The bubbles contained in the hydraulic oil are captured in the spaces in the surface and the interior of the member formed by bundling the steel wool, and the captured bubbles are collected, causing the bubbles to grow. When the bubbles grow and become large in size, the bubbles separate from the steel wool and rise upward (in the +z direction).

Thus, the bubbles can be effectively removed even when the outflow pipe 43 is filled with a material having a plurality of fine spaces formed in the surface and interior thereof. Note that the material that fills the outflow pipe 43 is not limited to steel wool, and a sintered metal or a sponge, for example, may be used.

Further, the steel wool need not fill the outflow pipe 43 entirely, and only at least the hollow portion of the outflow portion 40 needs to be filled with the steel wool in a long narrow strip shape in the direction orthogonal to the axis (xy plane).

Figure 8:
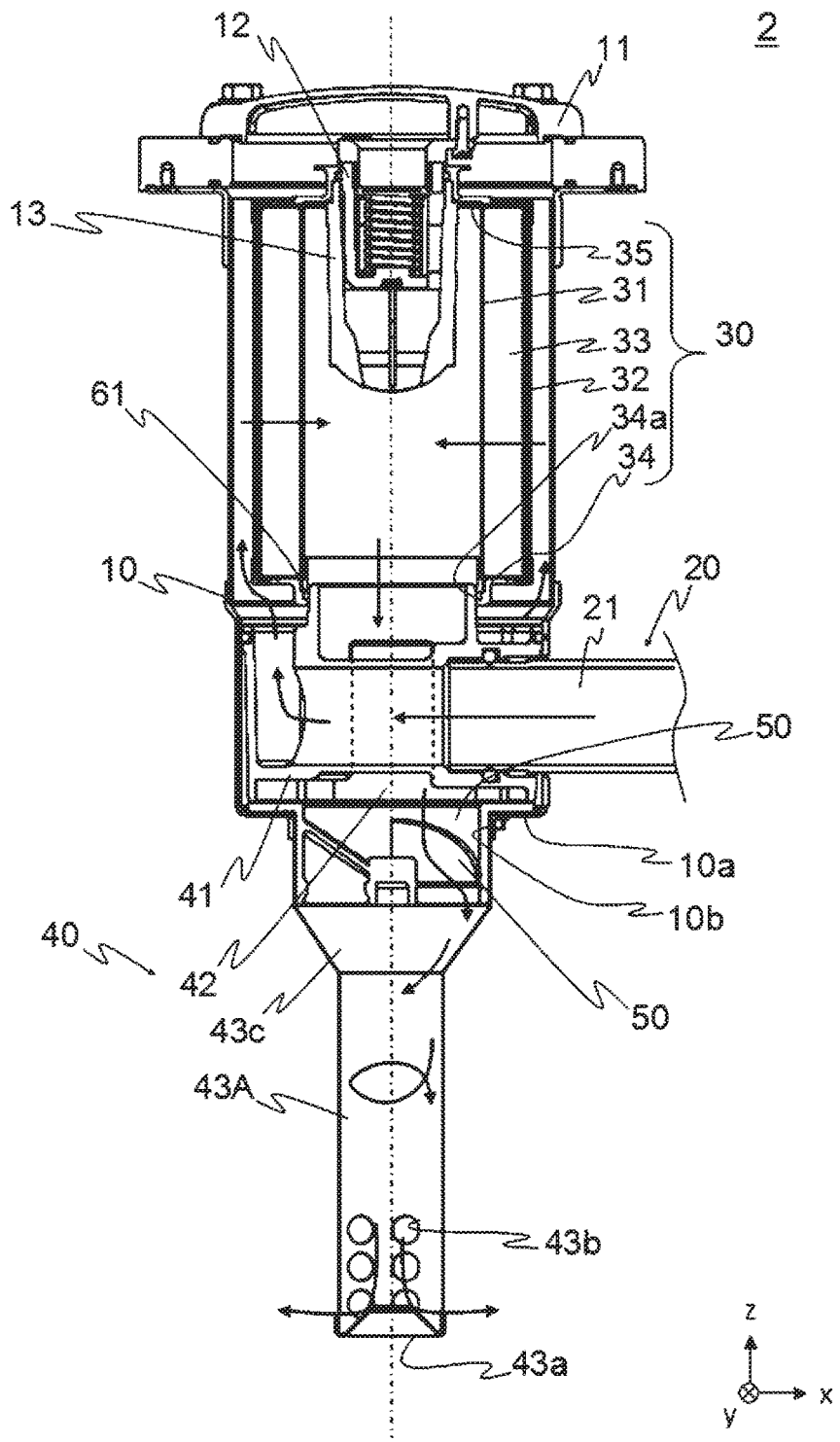
FIG. 8 is a diagram illustrating an overview of a return filter 2 that uses an outflow pipe 43A that forms a restricting portion 43c that gradually decreases a cross-sectional area of the pipe.

Further, while the outflow pipe 43 has a constant cross-sectional area in the present embodiment, the shape of the outflow pipe 43 is not limited thereto. FIG. 8 illustrates an overview of a return filter 2 that uses an outflow pipe 43A that forms a restricting portion 43c that gradually decreases a cross-sectional area of the pipe. The restricting portion 43c has the effect of further strengthening the vortex of the hydraulic oil. Thus, the restricting portion 43c is suitably provided to a position as close as possible to the vortex producing portion 50, that is, the blade members 53. Note that the position, length, taper angle, and the like of the restricting portion 43c are not limited to the illustrated configuration.

Embodiments of the invention have been described in detail with reference to the drawings; however, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

Further, the term "substantially" in the present invention is not to be understood as merely being strictly the same, and is a concept that includes variations and modifications to an extent that does not result in loss in identity. For example, the term "substantially orthogonal" is not limited to being strictly orthogonal, and is a concept that includes variations of several degrees, for example. Further, simple expressions such as orthogonal, parallel, and identical are not to be understood as merely being strictly orthogonal, parallel, identical, and the like, and include being substantially parallel, substantially orthogonal, substantially matching, and the like.

Furthermore, the meaning of the term "vicinity" in the present invention includes a region of a range (which can be determined as desired) near a position serving as a reference. For example, the term "a vicinity of an end" refers to a region of a range near the end, and is a concept indicating that the end may or may not be included.

REFERENCE SIGNS LIST 1, 2 Return filter
10 Filter case
10a Bottom surface
10b Opening 11 Lid
12 Valve
12a Outer peripheral surface
13 Bypass strainer
13a Frame
13b Filtration portion
13c Outer peripheral surface
13d Inner peripheral surface
20 Inflow portion
21 Inflow pipe
30 Filter element
31 Inner tube
32 Outer tube
33 Filtration member
34 Plate
34a Inner peripheral surface
35 Plate
35a, 35b Inner peripheral surface
35c Groove
40 Outflow portion
41 Fitting pipe
42 Inner side pipe
43, 43A Outflow pipe
43a Lower end surface
43b Hole
43c Restricting portion
50 Vortex producing portion
51 Main body portion
51a Hole
52 Flange portion
53 Blade member
54 Tubular portion
54a Hole
55 Air flow path
61, 62 Sealing member
100 Hydraulic oil tank
101 Tank main body
101a Inflow port
101b, 101c Opening
101d Outflow port
101e Partition plate
103 Lid
104 Suction pipe
105 Bolt
110 Suction strainer

The invention claimed is:

1. A return filter provided in a tank, comprising:
a filter element including a filtration member having a substantially cylindrical shape;
a filter case having a bottomed substantially cylindrical shape and provided with the filtration member therein;
an inflow portion configured to allow an inflow of oil and to communicate with a space between the filter case and the filter element;
an outflow portion having a substantially cylindrical shape and provided to a bottom surface of the filter case, the outflow portion being configured to communicate with a hollow portion of the filter element; and
a vortex forming portion provided in the outflow portion, the vortex forming portion including a blade member having a spiral shape,
wherein:
the vortex forming portion includes a tubular portion having a substantially cylindrical shape with a covered upper end, the tubular portion being formed extending along an axis of the blade member at a substantial center of the vortex forming portion;
the blade member includes, on a lower side thereof, a passage that crosses the blade member in a radial direction; and
the tubular portion and the outflow portion each include a hole that communicates with the passage.

2. A return filter provided in a tank, comprising:
a filter element including a filtration member having a substantially cylindrical shape;
a filter case having a bottomed substantially cylindrical shape and provided with the filtration member therein:
an inflow portion configured to allow an inflow of oil and to communicate with a space between the filter case and the filter element;
an outflow portion having a substantially cylindrical shape and provided to a bottom surface of the filter case, the outflow portion being configured to communicate with a hollow portion of the filter element;
a vortex forming portion provided in the outflow portion, the vortex forming portion including a blade member having a spiral shape;
an outflow pipe provided protruding downward from a bottom surface of the filter case, the outflow pipe being configured to communicate with the outflow portion; and
a lower end of the outflow pipe being covered by a lower end surface having a substantially truncated cone shape that increases in height and decreases in width toward a center, and a side surface of the outflow pipe in a vicinity of the lower end surface including a plurality of holes.

3. A return filter provided in a tank, comprising:
a filter element including a filtration member having a substantially cylindrical shape;
a filter case having a bottomed substantially cylindrical shape and provided with the filtration member therein;
an inflow portion configured to allow an inflow of oil and to communicate with a space between the filter case and the filter element;
an outflow portion having a substantially cylindrical shape and provided to a bottom surface of the filter case, the outflow portion being configured to communicate with a hollow portion of the filter element;
a vortex forming portion provided in the outflow portion, the vortex forming portion including a blade member having a spiral shape;
a lid configured to cover an upper end of the filter case;
a valve provided to the lid and configured to open and close depending on a difference in a pressure on an outer side of the filtration member and a pressure on an inner side of the filtration member; and
a bypass strainer configured to allow passage of the oil after passing through the valve, the bypass strainer including a frame having an inner peripheral surface to which the valve is fitted;
the filter element further including an upper plate that covers an upper end of the filtration member; and
the upper plate and the frame being integrated with each other.

4. The return filter according to claim 1, further comprising an outflow pipe provided protruding downward from a bottom surface of the filter case, the outflow pipe being configured to communicate with the outflow portion,
a lower end of the outflow pipe being covered by a lower end surface having a substantially truncated cone shape that increases in height and decreases in width toward a center, and a side surface of the outflow pipe in a vicinity of the lower end surface including a plurality of holes.

5. The return filter according to claim 1, further comprising:
a lid configured to cover an upper end of the filter case;
a valve provided to the lid and configured to open and close depending on a difference in a pressure on an outer side of the filtration member and a pressure on an inner side of the filtration member; and
a bypass strainer configured to allow passage of the oil after passing through the valve, the bypass strainer including a frame having an inner peripheral surface to which the valve is fitted;
the filter element further including an upper plate that covers an upper end of the filtration member; and
the upper plate and the frame being integrated with each other.

6. The return filter according to claim 2, further comprising:
a lid configured to cover an upper end of the filter case;
a valve provided to the lid and configured to open and close depending on a difference in a pressure on an outer side of the filtration member and a pressure on an inner side of the filtration member; and
a bypass strainer configured to allow passage of the oil after passing through the valve, the bypass strainer including a frame having an inner peripheral surface to which the valve is fitted;
the filter element further including an upper plate that covers an upper end of the filtration member; and
the upper plate and the frame being integrated with each other.

7. The return filter according to claim 4, further comprising:
a lid configured to cover an upper end of the filter case;
a valve provided to the lid and configured to open and close depending on a difference in a pressure on an outer side of the filtration member and a pressure on an inner side of the filtration member; and
a bypass strainer configured to allow passage of the oil after passing through the valve, the bypass strainer including a frame having an inner peripheral surface to which the valve is fitted;
the filter element further including an upper plate that covers an upper end of the filtration member; and
the upper plate and the frame being integrated with each other.

* * * * *